Jan. 19, 1971  M. W. PAPP  3,555,943
CROSS SLIDE CUTTER BLOCK ASSEMBLY
Filed June 27, 1968  2 Sheets-Sheet 1

INVENTOR.
MICHAEL W. PAPP
BY
Yount, Flynn & Tarolli
ATTORNEYS

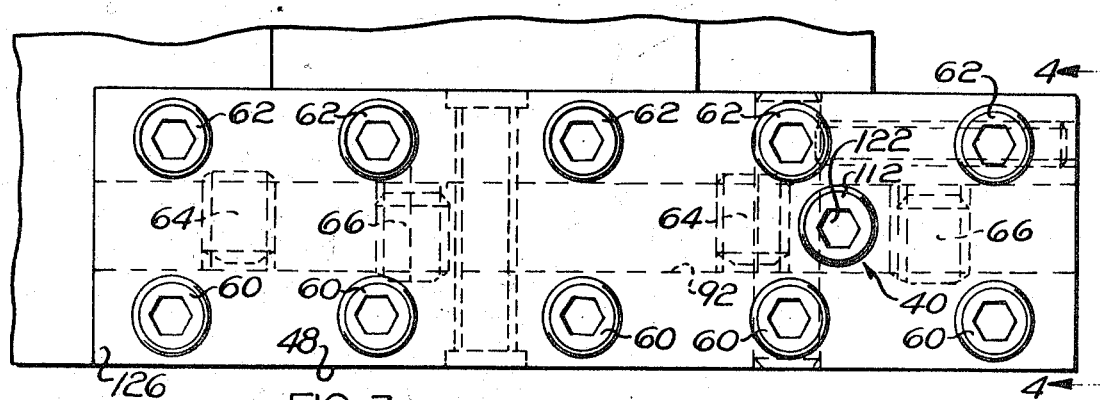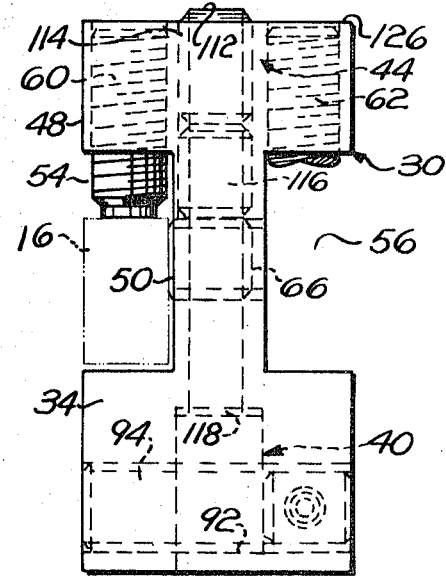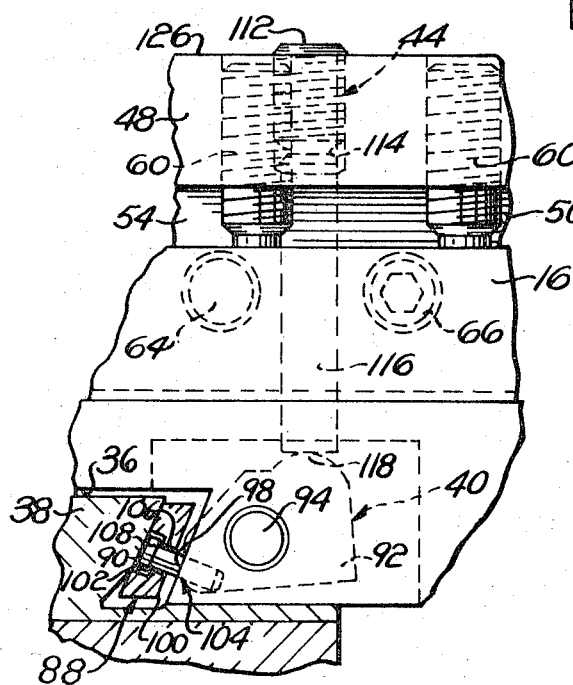

United States Patent Office 3,555,943
Patented Jan. 19, 1971

3,555,943
CROSS SLIDE CUTTER BLOCK ASSEMBLY
Michael W. Papp, Cleveland, Ohio, assignor to The Warner & Swasey Company, Cleveland, Ohio, a corporation of Ohio
Filed June 27, 1968, Ser. No. 740,577
Int. Cl. B23b 29/08
U.S. Cl. 82—37                    8 Claims

ABSTRACT OF THE DISCLOSURE

An improved cross slide cutter block assembly includes a clamp assembly for engaging a dovetail portion of a cross slide to hold a cutter block against movement relative to the cross slide. The clamp assembly is operated between clamping and release conditions by an actuator mounted in a top portion of the cutter block where it is readily accessible to an operator.

---

This invention relates generally to machine tools and more particularly to a cross slide cutter block assembly for holding a cutting tool or cutter.

It is an object of this invention to provide a new and improved cross slide cutter block assembly for use in association with the cross slide of a machine to hold a cutting tool and which cross slide cutter block assembly includes a clamp assembly having an actuator which is accessible from the top of the cross slide cutter block assembly to facilitate operating the clamp assembly between clamping and release conditions.

Another object of this invention is to provide a new and improved clamp assembly for holding a cutter block against movement relative to an associated cross slide.

Another object of this invention is to provide a new and improved cross slide cutter block assembly including a clamp assembly for engaging a dovetail portion of a cross slide and a threaded member mounted in engagement with a top portion of a cutter block so as to be readily accessible for operating the clamp assembly between a release condition wherein the cross slide cutter block assembly is movable relative to the dovetail portion of the cross slide and a clamping condition wherein the cross slide cutter block assembly is held against movement relative to the cross slide.

These and other objects and features of the invention will become more apparent upon a consideration of the following description taken in connection with the accompanying drawings wherein:

FIG. 3 is a plan view, taken along the line 3—3 of FIG. 2, further illustrating the structure of a cross slide cutter block assembly;

FIG. 4 is an end view, taken along the line 4—4 of FIG. 3, illustrating the arrangement of a pair of cutter slots formed in the cross slide cutter block assembly; and FIG. 5 is an enlarged fragmentary view of a clamp assembly for holding the cross slide cutter block assembly against movement relative to a cross slide and an actuator assembly for operating the clamp assembly.

This invention provides a cross slide cutter block assembly which includes a cutter block for holding a cutting tool and a clamp assembly which is operable to retain the cutter block against movement relative to a cross slide during a machining operation. An actuator assembly, which is accessible from the top of the cutter block, is provided for enabling an operator to readily move the clamp assembly between clamping and release conditions. It is anticipated that the cross slide cutter block assembly will be used in connection with many different types of turning machines which have cross slides for moving a cutting tool relative to a workpiece.

Figure 1:
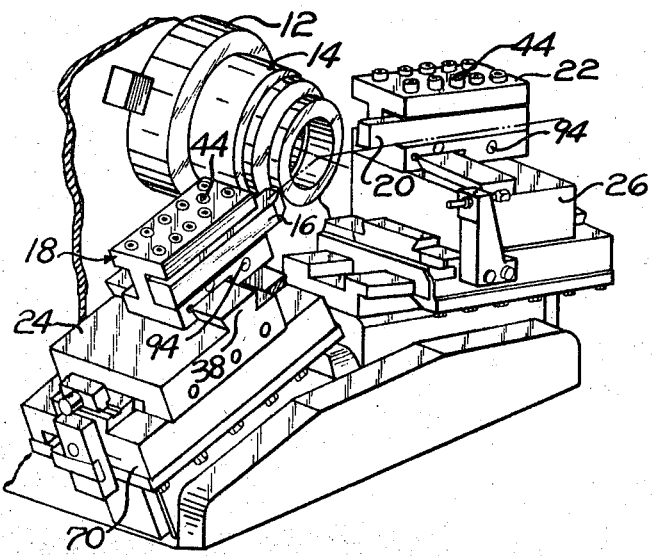
FIG. 1 is a schematic illustration of a turning machine having front and rear cross slide cutter block assemblies constructed in accordance with the present invention.

A known turning machine 10 is shown schematically in FIG. 1 and includes a spindle 12 for holding a workpiece 14. The workpiece 14 is being operated upon by a cutting tool or cutter 16 held in a front cross slide cutter block assembly 18 and by cutting tool or cutter 20 held by a rear cross slide cutter block assembly 22. The cross slide cutter block assemblies 18 and 22 are each mounted on an associated one of a pair of cross slides 24 and 26 which are moved in a known manner relative to the workpiece 14 to maintain the cutters 16 and 20 in cutting engagement with the workpiece.

The cross slide cutter block assembly 18 is mounted for adjustment along the cross slide 24. The cross slide cutter block assembly 18 includes a cutter block 30 (see FIG. 2) having a bottom or base portion 34 with a transversely extending dovetail slot 36 formed therein for mating engagement with a dovetail portion 38 of the cross slide 24. The cutter block 30 is movable longitudinally along the dovetail portion 38 of the cross slide 24 to enable the cutter 16 to be placed at a desired location along the longitudinal axis of the workpiece 14 (see FIGS. 1 and 2). A clamp assembly 40 is located in the bottom portion 34 of the cutter block 30 for holding the cutter block against movement relative to the front cross slide 24 once the cutter 16 has been moved to a desired position relative to the workpiece 14.

An actuator assembly 44 (see FIGS. 2, 3, 4 and 5) extends transversely through an upper portion 48 and an intermediate portion 50 of the cutter block 30 to operate the clamp assembly 40 between a release condition wherein the cutter block 30 is freely movable relative to the cross slide 24 and a clamping condition wherein the cutter block is held against movement relative to the cross slide 24. The actuator assembly 44 is accessible from the top of the cross slide cutter block assembly 18 (see FIG. 1) to facilitate operation of the actuator assembly by an operator of the turning machine. Therefore, the position of the cross slide cutter block assembly 18 can readily be adjusted relative to the workpiece 14 while the workpiece is mounted in the spindle 12.

Figure 2:
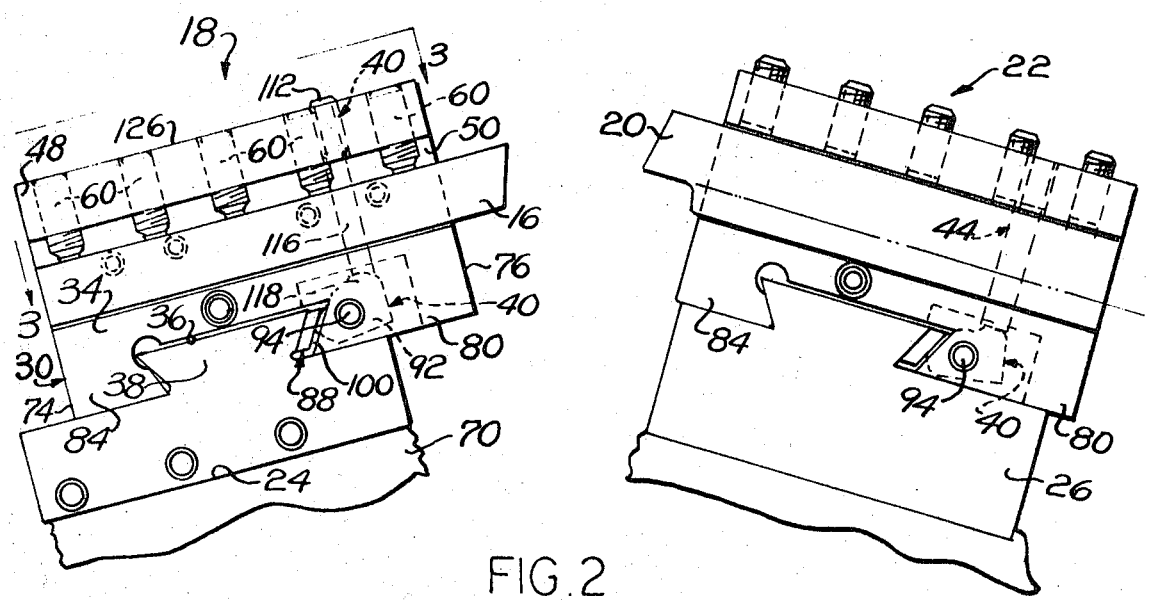
FIG. 2 is an elevational view, on an enlarged scale, of the cross slide cutter block assemblies of FIG. 1.

A pair of longitudinally extending cutter slots 54 and 56 are formed in the cutter block 30 between the top portion 48 and the base or bottom portion 34 of the cutter block for receiving cutting tools, similar to the cutter 16 (see FIGS. 2 and 4). The cutter 16 is securely held against movement relative to the cutter block 30 by a set of clamping screws 60 which are mounted in threaded engagement with tapped holes in the top portion 48 of the cutter block 30. Although only a single cutting tool 16 has been shown in connection with the cutter block 30, it will be apparent to those skilled in the art that another cutting tool could be mounted in the cutter slot 56 either in combination with the cutting tool 16 or by itself. Accordingly, a second set of clamping screws 62 are associated with the cutter slot 56 for clamping such a cutting tool. Suitable locating screws 64 and 66 are mounted in the intermediate or connector portion 50 in association with the respective cutter slots 54 and 56 to position cutting tools transversely relative to the cutter block 30.

In order to minimize the extent of tool overhang when a base 70 for the cross slide 24 cannot be positioned close to the workpiece 14, the dovetail slot 36 is offset relative to the centerline of the cutter block 30. Thus, the dovetail slot 36 is located closer to an end surface 74 of the cutter block than it is to the opposite end surface 76 of the cutter block. When the cross slide base 70 cannot be positioned close to the workpiece 14, the cutter block 30 is positioned with a relatively large portion 80 of the cutter block toward the workpiece in the manner shown in FIG. 2 for the front cross slide cutter block assembly 18. When the cross slide base 70 can be positioned relatively close to the workpiece, the orientation of the cross slide cutter block assembly is reversed relative to the cross slide so that a relatively small portion 84 of the cutter block is toward the workpiece and the cutter block assembly is orientated as shown in FIG. 2 for the rear cross slide cutter block assembly 22'.

The rear cross slide cutter block assembly 22 is of the same structure as is the front cross slide cutter block assembly 18. This increases the versatility of the cross slide cutter block assemblies by enabling the front cross slide cutter block assembly 18 to be used on the rear cross slide 26 in place of the rear cross slide cutter block assembly 22 and the rear cross slide cutter block assembly 22 to be used on the front cross slide 24 in place of the front cross slide cutter block assembly 18. In view of this similarity in structure, it is believed that the construction of the rear cross slide cutter block assembly 22' will be apparent from the foregoing description of the front cross slide cutter block assembly 18.

In order to hold the cutter 16 against movement longitudinally of a workpiece, the clamp assembly 40 includes a clamp or locking plate 88 (see FIG. 5) which is pressed into clamping engagement with an inwardly and downwardly sloping side surface 90 of the dovetail portion 38 of the cross slide 24. The plate 88 is pressed against the surface 90 by a rotatably or pivotally mounted cam 92 which is mounted on a shaft or pin 94 extending transversely across the bottom portion 34 of the cutter block 30 (see FIG. 4). Pivoting movement of the cam 92 in a clockwise direction, as viewed in FIG. 5, presses a nose portion 98 of the cam against a back surface 100 of the plate member 88 to move the plate member along a path extending generally perpendicular to the surface 90 of the dovetail 38 to thereby press a front or clamping surface 102 of the plate member 88 into clamping engagement with the surface 90 of the dovetail 38. This movement of the plate member 88 relative to the bottom portion 34 of the cutter block 30 is guided by a pair of pins 104 (only one of which is shown) which are fixedly mounted on the bottom portion 34 of the cutter block 30 and extend through apertures 106 in the plate member 88. The pins 104 have head portions 108 which are received in recesses formed in the plate member 88 to prevent the plate member from being separated from the cutter block 30 and to provide clearance between the head portions 108 and the dovetail 38.

The actuator assembly 44 is provided for operating the clamp assembly 40 between a clamping condition (see FIGS. 2 and 5), wherein the plate member 88 clampingly engages the dovetail portion 38 to hold or lock the cutter block against movement relative to the cutter slide 24, and a release condition, wherein the cam 92 is free to move in a counterclockwise direction from the position shown in FIGS. 2 and 5 so that the plate member 88 is not pressed against the dovetail 38 and the cutter block 30 is free to move longitudinally along the dovetail. To this end, the actuator assembly 44 includes a threaded operator member 112 which engages threads formed in a hole or bore 114 in the top portion 48 of the cutter block 30 (see FIGS. 2 and 4). A follower pin or shaft 116 extends between the bottom end of the operator member 112 and an actuator nose portion 118 of the cam 92.

When the operator member 112 is rotated in a clockwise direction, as viewed in FIG. 3, the mating threads on the operator member and the top portion 48 of the cutter block 30 cause the operator member to move downwardly in the hole or bore 114 to press the follower pin 116 against the nose portion 118 of the cam 92 (see FIG. 5). This pressure causes the cam 92 to pivot in a clockwise direction (as viewed in FIGS. 2 and 5) to press the plate member 88 against the dovetail 38 and thereby clamp the cutter block 30 against movement relative to the cross slide 24. Upon rotation of the operator member 112 in the opposite direction, the follower pin 116 is free to move outwardly and the pressure against the follower pin is relieved so that the cam 92 is free to rotate in a counterclockwise direction, as viewed in FIGS. 2 and 5, to release the cutter block 30 for movement longitudinally along the dovetail 38. Although the operator member 112 is illustrated as being a set screw having a socket 122 (FIG. 3) for receiving a tool to rotate the operator member, it is contemplated that the operator member could have a built-in handle and be formed integrally with the follower pin 116.

In accordance with the present invention, the operator member 112 is located at the top portion 48 of the cutter block 30 so that it is readily accessible to an operator of the machine 10 to facilitate operating the clamp assembly 40 between the clamping and release conditions. To this end, the threaded bore or hole 114 has an opening formed in an upper or outer surface 126 of the top portion 48. The actuator assembly 44 extends through the top portion 48 and intermediate portion 50 to the bottom portion 34 of the cutter block to enable the clamp assembly 40 to be moved between the release and clamping conditions by merely rotating the operator member 112 which is exposed by the hole 114 in the top portion 48 of the cutter block assembly 18. Heretofore, a known cross slide cutter block assembly was retained against movement relative to a cross slide by suitable screw means extending longitudinally of the bottom portion of the cutter block. When this known cutter block is mounted on the cross slide of a turning machine, the location of the screw means makes it relatively awkward to adjust the position of the cutter block relative to the cross slide. By providing an actuator assembly 44 which is accessible from the top of the cutter block assembly, the position of the cutter block assembly relative to the cross slide can be readily adjusted even when the workpiece 14 is mounted in the turning machine 10.

Having described my invention, I claim the following:

1. A cross slide cutter block assembly comprising a cutter block having longitudinally extending base and top portions with an intermediate portion extending there between for defining a cutter slot extending for the entire longitudinal length of said cutter block and adapted to receive a cutting tool, a plurality of relatively movable members mounted on said top portion and extending therethrough for clamping engagement with the cutting tool in said cutter slot with the longitudinal axis of the cutting tool extending longitudinally of said cutter block, said base portion defining a dovetail slot extending transversely of said cutter block and adapted to receive a dovetail portion of a closs slide, a clamp assembly mounted on said base portion adjacent to the dovetail slot for clampingly engaging the dovetail portion of the cross slide, said clamp assembly including a cam rotatably mounted on said base portion for movement between locking and release conditions, and a clamp actuator assembly extending through said top and intermediate portions of said cutter block and operatively connected with said clamp assembly for rotating said cam between the locking condition in which said clamp assembly clampingly engages the dovetail portion of the cross slide to hold said cutter block against movement relative to the cross slide and the release condition in which said cutter block is movable relative to the cross slide, said clamp actuator assembly including operator means mounted in engagement with and accessible at the top portion of said cutter block for effecting rotation of said cam to operate said clamp assembly between said locking and release conditions.

2. A cross slide cutter block assembly comprising a cutter block having base and top portions with an intermediate portion extending therebetween for defining a cutter slot extending longitudinally of said cutter block and adapted to receive a cutting tool, a plurality of relatively movable members mounted on said top portion for clamping the cutting tool in said cutter slot with the longitudinal axis of the cutting tool extending longitudinally of said cutter block, said base portion defining a dovetail slot extending transversely of said cutter block and adapted to receive a dovetail portion of a cross slide, said dovetail slot being offset relative to the centerline of said cutter block to enable the orientation of said cutter block relative ot the dovetail portion of the cross slide to be reversed to vary the extent which said cutter block projects transversely from the dovetail portion of the cross slide to facilitate supporting the cutting tool for working at different locations relative to the centerline of a workpiece, a clamp assembly mounted on said base portion adjacent to the dovetail slot for clampingly engaging the dovetail portion of the cross slide, and a clamp actuator assembly operatively connected with said clamp assembly for operating said clamp assembly between a locking condition in which said clamp assembly clampingly engages the dovetail portion of the cross slide to hold said cutter block against movement relative to the cross slide and a release condition in which said cutter block is movable relative to the cross slide, said clamp actuator assembly including operator means accessible at the top portion of said cutter block for operating said clamp assembly between said locking and release conditions.

3. A cross slide cutter block assembly as set forth in claim 2 wherein said clamp assembly includes a clamp plate adapted to engage a sloping side surface of the dovetail portion of the cross slide and a cam which is operated by said clamp actuator assembly to press said clamp plate against the sloping side surface of the dovetail portion when said clamp assembly is in the locking condition.

4. A cross slide cutter block assembly as set forth in claim 2 wherein said operator means includes a screw means mounted in threaded engagement with said top portion of said cutter block and movable relative thereto to effect operation of said clamp assembly.

5. A cross slide cutter block assembly as set forth in claim 2 wherein said clamp assembly includes a cam which is rotatable to effect operation of said clamp assembly between said locking and release conditions, and wherein said operator means of said clamp actuator assembly is movable toward and away from said bottom portion of said cutter block to rotate said cam.

6. A cross slide cutter block assembly as set forth in claim 1 wherein said operator means includes a screw member which is mounted in threaded engagement with said top portion of said cutter block and is rotatable about a first axis to rotate said cam about a second axis to operate said clamp assembly from said release condition to said locking condition.

7. A cross slide block assembly as set forth in claim 5 wherein said clamp assembly further includes a plate members which is moved into and out of clamping engagement with a sloping side surface of the dovetail portion of the cross slide by the rotation of said cam.

8. A cross slide cutter block assembly comprising a cutter block having longitudinally extending top and bottom portions with an intermediate portion extending therebetween for defining a cutter slot extending for the entire longitudinal length of said cutter block and adapted to hold a cutting tool, said bottom portion of said cutter block defining a dovetail slot extending transversely of said cutter block and adapted to engage a dovetail portion of a cross slide, clamp means for clampingly engaging said dovetail portion of said cross slide to hold said cutter block against movement relative to said cross slide, said clamp means including a plate member movable relative to said cutter block in a direction substantially perpendicular to a sloping side surface of the dovetail portion of the cross slide, means for guiding the movement of said plate member relative to the sloping side surface of the dovetail portion of the cross slide, and a cam member mounted for rotation about an axis extending transversely of said cutter block to move said plate member into clamping engagement with the sloping side surface of the dovetail portion of the cross slide, and actuator means extending through said top and intermediate portions of said cutter block and adapted to be operated adjacent to the top portion of said cutter block to move said clamp means into clamping engagement with the dovetail portion of the cross slide, said actuator means including a threaded member mounted in engagement with said top portion of said cutter block and rotatable relative thereto to rotate said cam member, said threaded member being accessible at said top portion of said cutter block to enable an operator of said cross slide cutter block assembly to readily operate said clamp means.

References Cited
UNITED STATES PATENTS

| | | | |
|---|---|---|---|
| 1,527,791 | 2/1925 | Flanders | 29—1.5X |
| 2,174,860 | 10/1939 | Montgomery et al. | 82—24 |
| 2,243,277 | 5/1941 | Honekamp | 82—36 |

LEONIDAS VLACHOS, Primary Examiner